(No Model.) 5 Sheets—Sheet 1.
L. H. WATSON.
IRONING MACHINE.
No. 439,454. Patented Oct. 28, 1890.
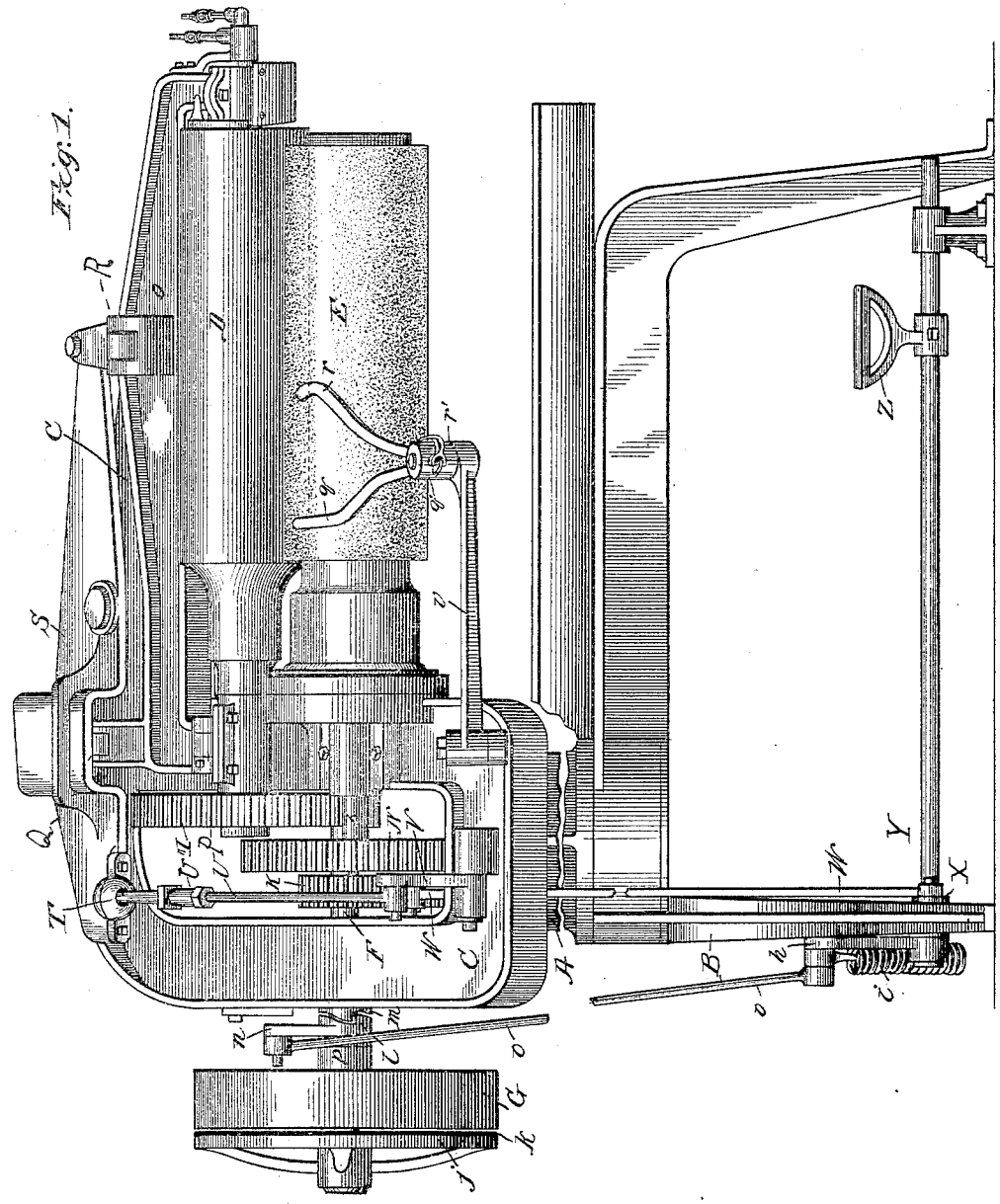
Witnesses.
Inventor
Lewis H. Watson
By Jno. G. Elliott
Atty.

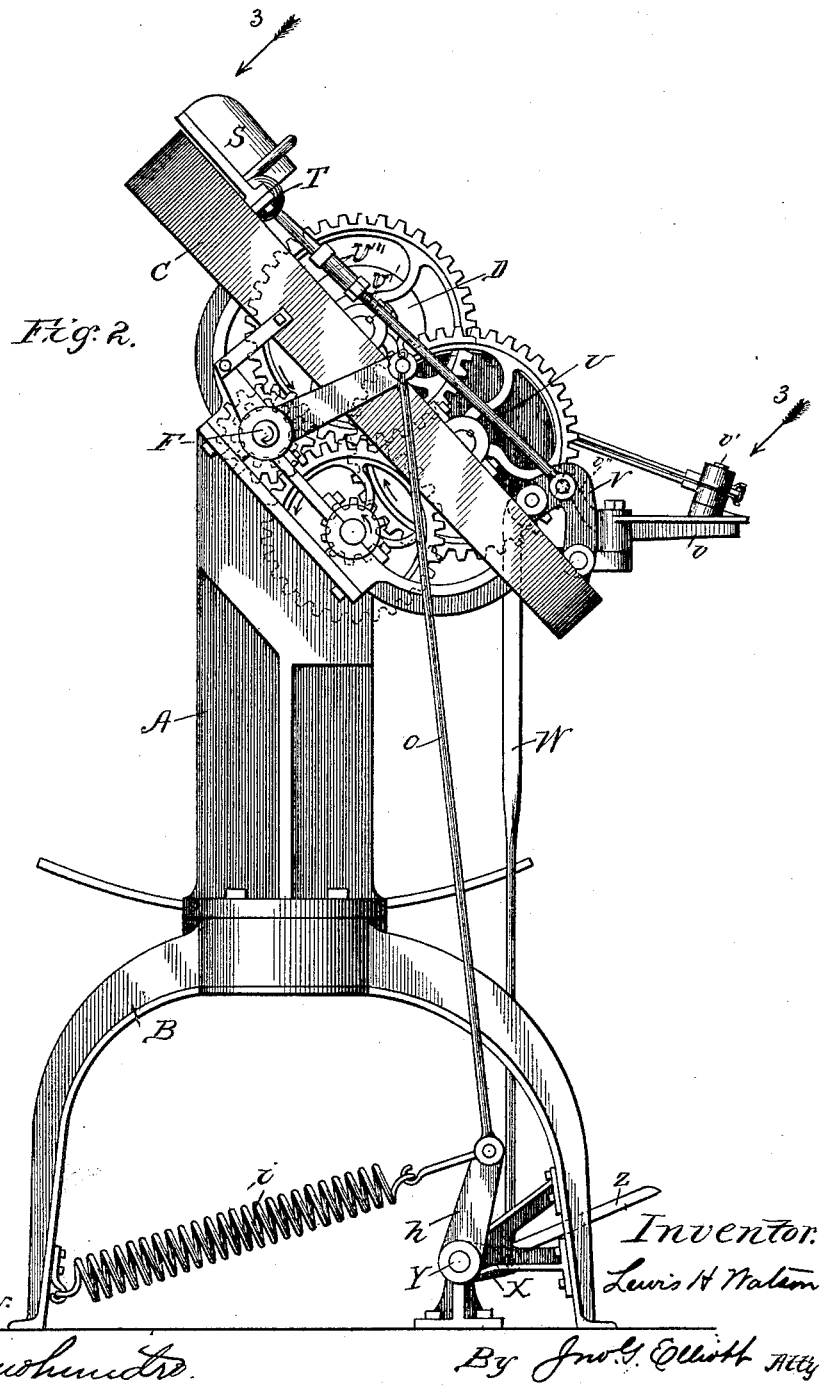

(No Model.) 5 Sheets—Sheet 3.
L. H. WATSON.
IRONING MACHINE.
No. 439,454. Patented Oct. 28, 1890.
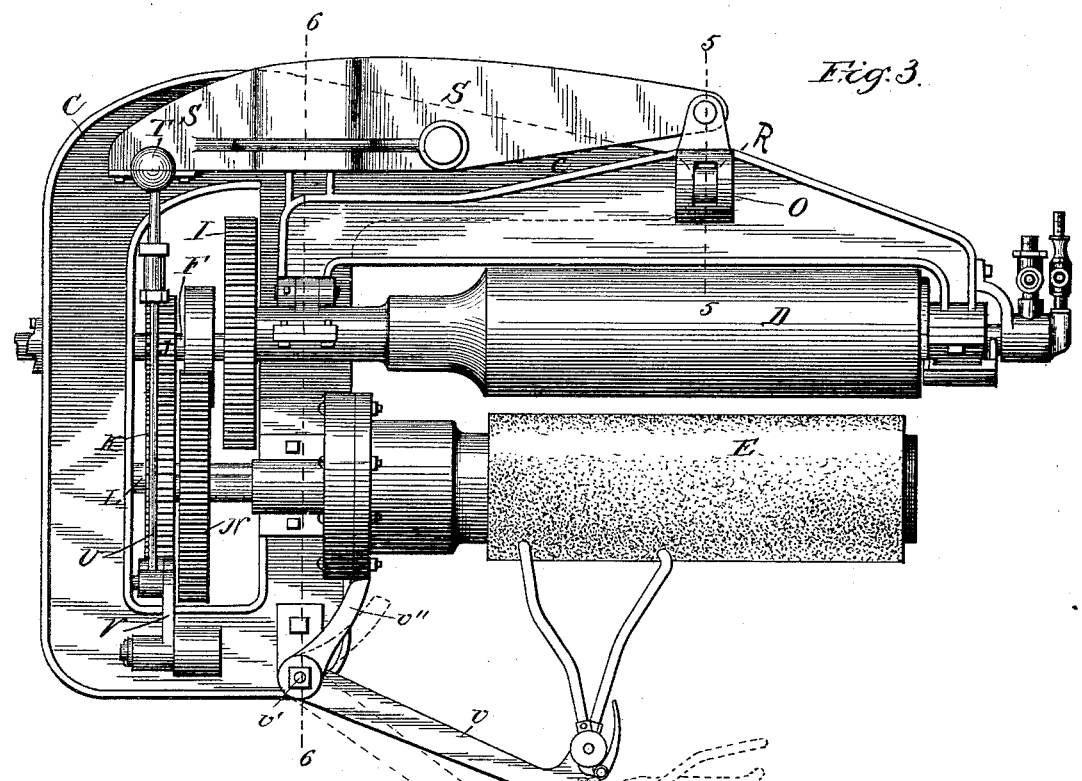
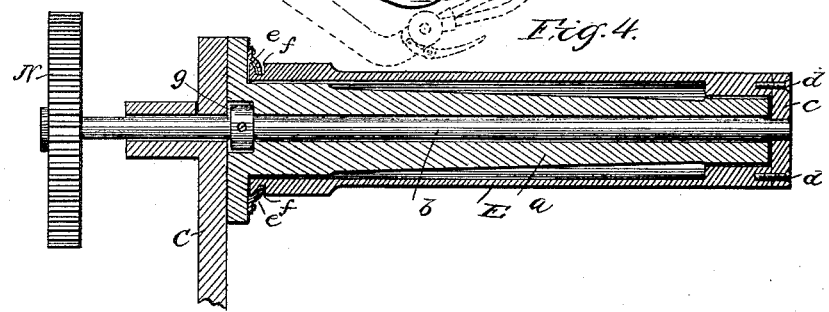
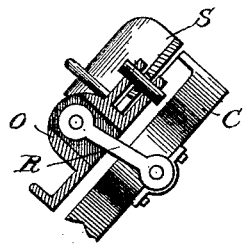
Witnesses.
Inventor.
Lewis H. Watson
By Jno. G. Elliott
Atty.

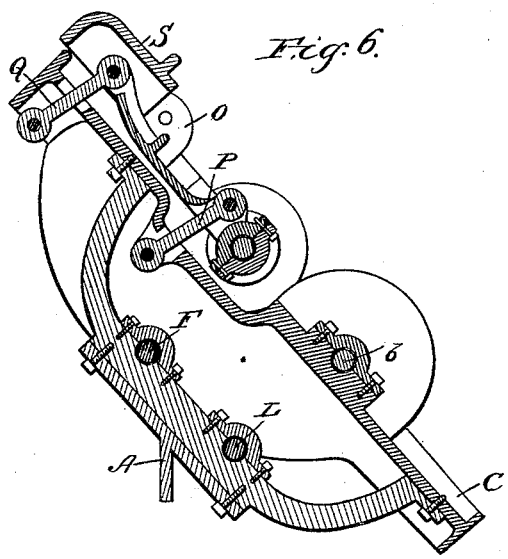
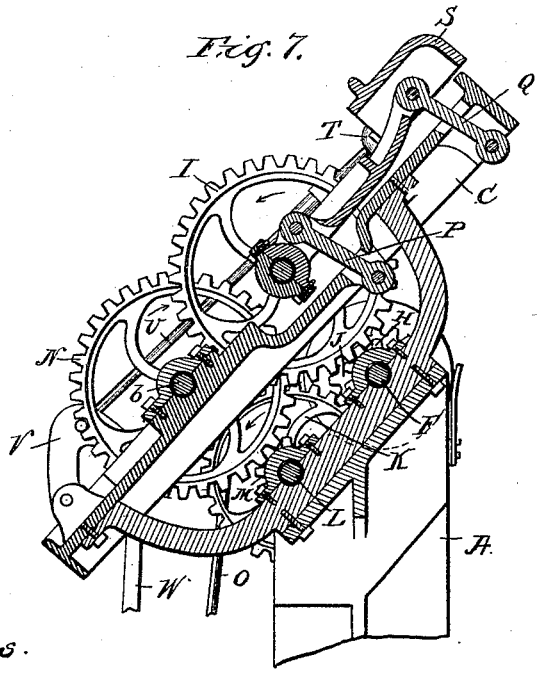

(No Model.) 5 Sheets—Sheet 5.
L. H. WATSON.
IRONING MACHINE.

No. 439,454. Patented Oct. 28, 1890.

Witnesses.

Inventor.
Lewis H. Watson
By Jno. G. Elliott
Atty.

UNITED STATES PATENT OFFICE.

LEWIS H. WATSON, OF CHICAGO, ILLINOIS.

IRONING-MACHINE.

SPECIFICATION forming part of Letters Patent No. 439,454, dated October 28, 1890.

Application filed May 1, 1889. Serial No. 309,224. (No model.)

*To all whom it may concern:*

Be it known that I, LEWIS H. WATSON, a citizen of the United States, and a resident of Chicago, in the county of Cook and State of Illinois, have invented certain new and useful Improvements in Ironing-Machines, of which the following is a specification.

This invention relates to improvements in that class of ironing-machines especially adapted for ironing the body and skirt portions of shirts, the pressure-rollers of which are so arranged that the shirt may be sleeved upon one of them.

The object of my invention is to produce an ironing-machine of the construction herein set forth and shown for accomplishing the purposes hereinafter described, whereby a very effective and durable machine is produced.

Figure 8:
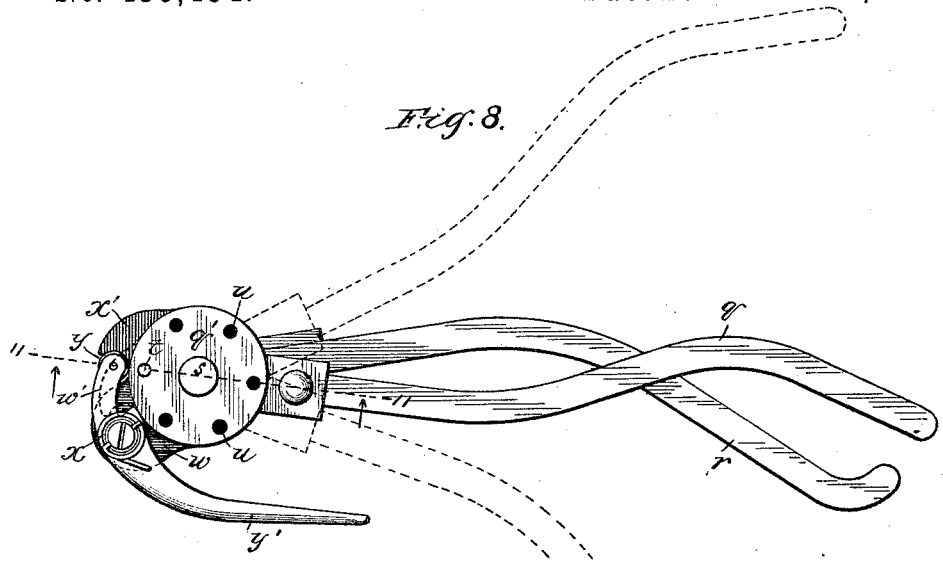
Figure 9:
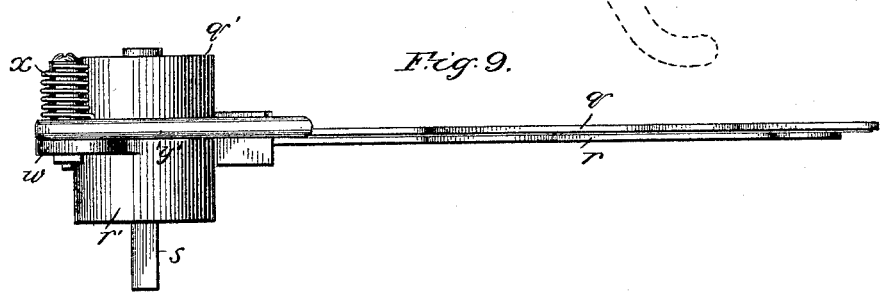
Figure 10:
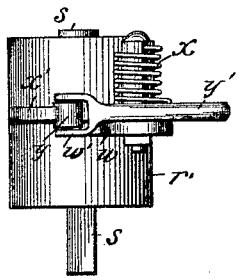
Figure 11:
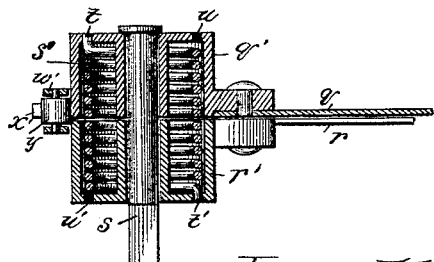

Figure 1 represents a front elevation of an ironing-machine embodying my invention, showing a portion of the standard or frame thereof broken away at the center; Fig. 2, a side elevation of the machine; Fig. 3, an oblique top view thereof, looking in the direction indicated by the arrows 3 3 of Fig. 2; Fig. 4, a central longitudinal section through the lower padded roller with the padding removed; Fig. 5, a detail section on the line 5 5 of Fig. 3; Fig. 6, a detail transverse vertical section on the line 6 6 of Fig. 3, looking toward the rollers; Fig. 7, a similar view on the same line, looking in the opposite direction; Fig. 8, a detail plan view of the sleeve-stretcher; Fig. 9, a side elevation thereof; Fig. 10, an end elevation of the same, and Fig. 11 a detail vertical section on the line 11 11 of Fig. 8.

Similar letters of reference indicate the same parts in the several figures of the drawings.

Referring by letter to the accompanying drawings, A indicates a vertical standard mounted upon a suitable base B, and having secured to the top thereof an oblique or inclined frame C, in which latter is journaled and supported a heating-roller D and padded roller E, together with the gears and shafts for operating these rollers.

F indicates the power-shaft for operating the rollers, having loosely mounted on the outer end thereof beyond the frame C a belt-pulley G and a clutch device for transmitting the power of this pulley to the shaft, the construction of which will be described in detail farther on. On this shaft is mounted a small cog-wheel H, meshing with and driving a larger cog-wheel I, mounted upon the end of the shaft carrying the ironing-roller D, and also a cog-wheel J, meshing with a larger cog-wheel K, mounted upon a short counter-shaft L, journaled in the frame C, upon which latter is also mounted a smaller cog-wheel M, meshing with and driving a larger cog-wheel N, mounted upon the end of the shaft carrying the padded roller E, so that both of said rollers, through the medium of this gearing, are driven from the same source of power, with the proper relative speed and with their contacting-surfaces traveling in the same direction.

The padded roller E, the construction of which is more clearly shown in Fig. 4, is hollow, and has a bearing at each end thereof only upon a hollow support $a$, extending centrally therethrough, through which the shaft $b$ thereof loosely works, said support being rigidly bolted to the frame C of the machine. This shaft connects with and operates the roller through the medium of a disk $c$, keyed upon the outer end of the shaft beyond the roller E, to the end of which latter it is secured by means of screws $d$, or in any other well-known and convenient manner. The inner end of the roller E is held in place by an annular ring $e$, secured to a flange on the support $a$, and projecting freely into an annular groove $f$ formed in the end of the roller.

The shaft $b$ is prevented from having endwise movement by means of a collar $g$ thereon, confined and working in a recess between the inner end of the support $a$ and the supporting-frame C.

The roller E, when prepared for use, is wound with cloth in the usual manner to produce a padded roller, such as is illustrated in Figs. 1 and 3 of the drawings, the said roller, as will be understood from the foregoing description, being stationary with relation to the supporting-frame C of the machine, and it is upon this roller that the shirt or other goods to be ironed is sleeved, the end of the roller, although supported through its center, as above described, being free, so that a shirt, skirt, or other character of goods may be readily slipped on the end thereof. The roller D, however, which is the heated roller, is movable toward and away from the padded roller, and is employed to impart the necessary pressure to the goods in the ironing operation, to which end the said roller is journaled in suitable boxes upon the ends of a yoke O, which latter is in turn supported upon and carried by a set of parallel links P, Q, and R, pivotally attached to the frame C, the first two in a line with each other at the inner end of the yoke, as shown in Figs. 6 and 7, and the latter one toward the outer end thereof just beyond the center of length, as shown in Figs. 1, 3, and 5, the relative position of the links being shown in Fig. 1. These links are so arranged with relation to the roller that the latter remains substantially parallel with the padded roller E, throughout its movement toward and away from said roller, the movement being in practice so slight that the gears H I are not taken out of mesh.

The yoke carrying the heated ironing-roller is actuated so as to cause the said roller to move toward and away from the padded roller by means of a lever S, pivoted about the center of length thereof upon the frame C, and pivotally connected at the outer end thereof with said yoke to the inner end of which lever is connected, by a ball-and-socket joint T, one end of a connecting-rod U, the opposite end of which is pivotally connected with a bent crank-arm V, pivoted to the frame C, with which arm also pivotally connects the upper end of a rod W, the lower end of which is attached to a crank-arm X, upon a shaft Y, journaled in the lower part of the base B, upon which shaft is also mounted a foot-lever Z, for imparting a partial rotation thereto. Thus it will be seen that whenever the foot-lever Z is depressed the heated ironing-roller will be caused to approach and bear against the padded roller, exerting a powerful pressure thereon throughout its length, which pressure may be readily adjusted and determined by forming the connecting-rod U in two parts or sections, as shown, and providing one part or section with a screw U' and the other with a screw-threaded socket U'', for shortening or lengthening the rod, although a swivel-screw or any other well-known mechanical device for accomplishing the same end might be employed instead of the device above referred to without departing from the spirit of my invention. The effect of lengthening the connecting-rod is to change the radial position of the crank-arm V, and also of the foot-lever Z, increasing the stroke of both, and consequently increasing the movement of the lever S, operating the heating-roller, causing the same to bear with greater power upon the pressure-roller, for it will be understood that in practice the throw of the foot-lever is so arranged as to bring the crank-arm V almost on a dead-center, under all circumstances, when the foot-lever completes its stroke, and obviously the greater the stroke of the foot-lever and crank-arm the greater will be the movement of the pressure or ironing roller, and consequently the greater will be the force exerted thereby upon the padded roller; but even should the crank-arm be accidently moved onto the dead-center the force of the spring $i$, hereinafter described, would be sufficient to overcome the dead-center and return the parts to their normal position.

The normal position of the ironing-roller is out of engagement with the padded roller, as shown in Fig. 3, and in order to maintain it in this position a crank-arm $h$ is attached to the shaft Y, to the free end of which is secured one end of a coiled spring $i$, the opposite end of which is attached to a stationary portion of the frame, the power of which spring is sufficient and tends to rotate the said shaft in the opposite direction to that given by the foot-lever, and thus causes the roller to automatically move away from the padded roller whenever the foot-lever is relieved of the pressure of the foot of the operator. It is also designed that the machine shall cease to operate whenever the rollers are in their normal separated position for the purpose of facilitating the sleeving of the goods upon the padded roller, to accomplish which any suitable form of clutch device or belt-shifting arrangement might be employed; but I prefer to employ in connection with my machine mechanism which will operate automatically and simultaneously with the moving of the ironing-roller into and out of engagement with the padded roller, imparting power thereto when the rollers are in engagement and arresting the operation of the machine whenever the rollers are separated and resume their normal position. To this end I employ the belt-pulley G, loose upon the shaft and capable of slight endwise movement, opposing which is arranged a friction-disk $j$, mounted fixedly upon the end of the power-shaft and preferably provided with a facing of rubber, felt, or paper $k$, or any other suitable material for establishing a frictional connection between said disk and the opposing face of the pulley. The pulley is moved longitudinally upon the power-shaft, so as to bear against the disk and by frictional hold impart its rotary motion thereto by means of a cam-collar $l$, loose upon the power-shaft, working against a corresponding opposing cam collar or surface $m$, fixed to a stationary portion of the machine, so as not to revolve, the loose cam-collar being provided with a crank-arm $n$, to the end of which is pivotally connected a rod $o$, the opposite end of which is attached to the free end of the crank-arm $h$ upon the shaft Y, so that whenever the collar is caused to rotate upon the shaft the opposing cam-faces will cause the collar to have an endwise movement bearing against the hub $p$ of the pulley and forcing the latter into frictional contact with the disk, the movement of these parts being so arranged that the pulley will be thrown into frictional engagement with the disk simultaneously with the engagement of the ironing with the padded roller, and the action of the spring I in reversing the position of the parts and moving the ironing-roller away from the padded roller to its normal position will simultaneously release the clutch and permit the pulley to revolve freely upon the power-shaft. This clutch, however, forms the subject-matter for another application filed by me on the 19th day of August, 1889, Serial No. 321,211, and therefore need not be described or illustrated in greater detail herein, being shown in this case merely for the purposes of illustrating its combination with this particular machine, for use in connection with which it is especially adapted; but I may here state that any other form of clutch device or stop which will operate to automatically arrest the operation of the machine when the ironing-roller is out of engagement with the padded roller and transmit the power thereto simultaneously with the movement of the rollers into engagement, may be employed in connection therewith without departing from the spirit of my invention.

Another important feature of my invention is the sleeve-stretcher, (shown applied to the machine in Figs. 1, 2, and 3 and in detail in Figs. 8, 9, 10, and 11,) consisting of a pair of spring-actuated arms $q$ $r$, lying in a plane substantially parallel with each other, the butt-ends of which terminate in hollow cups $q'$ $r'$, pivoted together by a pin or bolt $s$, passing axially therethrough and normally actuated to spread or separate from each other to the position shown by dotted lines in Fig. 8 by means of a coiled spring $s'$ confined within the cups, the ends $t$ $t'$ of which, respectively, engage one of an annular series of perforations $u$ $u'$, respectively, in the cups $q'$ and $r'$. The pin $s$ projects entirely through the cups and sufficiently beyond the same to afford a pivot-connection with the outer end of an angular arm $v$, pivoted at $v'$ upon the frame C, so that the arm may swing freely toward and away from the padded roller, being limited in its movement toward the roller by the angular portion $v''$, which impinges against a suitable stationary portion of the frame of the machine and constitutes a stop.

In order that the arms $q$ $r$ of the sleeve-stretcher may be held together in the position shown in full lines in Fig. 8 for inserting in the sleeve, the cup $r'$ is provided with a lug or projection $w$, upon which is pivoted a pawl $w'$, controlled by a spring $x$, coiled upon the elongated pivot thereof with its ends secured, respectively, to said pivot and pawl and operating to throw the pawl in toward the cup, so as to engage a tooth or projection $x'$ upon the other cup $q'$ whenever the parts are moved to the position shown in Fig. 8. The pawl is provided with an anti-friction roller $y$ on the end thereof, which directly engages the tooth $x'$, so as to reduce the friction between these parts and render their separation easier, the pawl being also provided with a rearward extension or hand-lever $y'$ for convenience in manipulating the same.

As before stated, the arms of the sleeve-stretcher are forced together and locked in the position shown in Fig. 8, when they may, through the medium of their pivot-connection with and the pivotal support of the arm $v$, be moved to a convenient position for insertion into the sleeve of the shirt, the forward ends thereof reaching up to the armhole of the sleeve, after which the pawl is manipulated by the hand-lever $y'$ so as to release the tooth $x'$, when the arms will fly out to the position shown by the dotted lines in said figure, stretching the sleeve smoothly and flatly and holding it in perfect position for passing between the rollers of the machine, between which and the stretcher the proper relative distance is maintained by the stop on the arm supporting the stretcher, as before described.

Having described my invention, what I claim, and desire to secure by Letters Patent, is—

1. In an ironing-machine, the combination, with the main frame and a stationary roller, of a movable support parallel with the roller, an ironing-roller journaled therein, links connecting the said support and main frame, a lever pivotally connected with the said support and the frame, and a means for operating the lever and thereby the support and the roller journaled therein, for the purpose described.

2. In an ironing-machine, the combination, with the stationary padded roller, of the upper ironing-roller, a movable support therefor, parallel links pivoted to the frame of the machine and carrying said support, a lever for operating said support, a treadle, and a rod and crank-arm connection between said lever and treadle, substantially as described.

3. In an ironing-machine, the combination, with the lower stationary padded roller, of the upper ironing-roller, a movable support therefor, parallel links pivoted to the frame of the machine and carrying said support, a lever for operating said support, a foot-treadle, a rod and crank-arm connection between said lever and treadle, and a spring opposing the action of said treadle for normally maintaining the heated roller out of contact with the padded roller, substantially as described.

4. In an ironing-machine, the combination, with the lower stationary padded roller, a power-shaft, and a gear-connection between said shaft and roller, of the upper ironing-roller, a gear-connection between said roller and the power-shaft, a movable support therefor, parallel links pivoted to the frame of the machine and carrying said support, a lever pivotally connected with said support at one end, a crank-arm pivoted to the frame of the machine, a rod pivoted to said crank-arm at one end and having a ball-and-socket connection with the lever at its opposite end, a shaft loosely journaled in the base of the machine, a crank-arm thereon, a rod connecting said crank-arm with the crank-arm pivoted to the frame of the machine, a foot-lever keyed on said shaft, and a coiled spring attached at its ends, respectively, to a stationary portion of the frame of the machine, and a crank on said shaft, substantially as described.

5. In an ironing-machine, the combination, with a hollow stationary roller, a movable pressure-roller and mechanism for operating said roller to approach and recede from the stationary roller, of an internal support constituting bearings for said hollow stationary roller, a rotatable shaft working through said support connected with and operating the hollow roller at the free end thereof, substantially as described.

6. In an ironing-machine, the combination, with a stationary hollow roller, a movable pressure-roller, and mechanism for operating said roller to approach and recede from the stationary roller, of a hollow central support rigidly secured to the frame of the machine and constituting an internal bearing for the hollow roller at each end thereof, a rotatable shaft working through said support, a disk on the end thereof bolted to the end of the hollow roller, and an annular ring secured to said support and projecting into a peripheral groove in the inner end of said roller, substantially as described.

7. The combination, with an ironing-machine, of a pair of opposing yielding arms constituting a sleeve-stretcher, substantially as and for the purpose described.

8. The combination, with an ironing-machine, of a pair of opposing spring-actuated yielding arms constituting a sleeve-stretcher, substantially as described.

9. The combination, with an ironing-machine, of a pair of opposing spring-actuated yielding arms and a lock device for holding said arms against the action of said springs, substantially as described.

10. The combination, with an ironing-machine, of a supporting-arm pivotally connected therewith, a stop therefor, a sleeve-stretcher provided with opposing yielding arms, and a pivot-connection between said stretcher and supporting-arms, substantially as described.

11. The combination, with an ironing-machine, of an angular supporting-arm, one branch of which constitutes a stop for said arm, a sleeve-stretcher pivoted to said arm at the free end thereof, the opposing spring-actuated yielding arms of said stretcher, and a lock device for locking the same against the action of the springs, substantially as described.

12. The combination, with an ironing-machine, of a sleeve-stretcher consisting of opposing arms provided with cups at their inner ends, a pivoting-bolt working through said cups, a coiled spring confined within said cups and attached at its ends, respectively, thereto, a lug on one of said cups, a tooth on the other, and a lever-pawl pivoted on said lug and adapted and arranged to engage the tooth when the arms are brought together, substantially as described.

13. In an ironing-machine, the combination, with the main frame and a stationary roller supported thereby, of an ironing-roller, a support therefor, parallel links which have one end pivoted to the support and their opposite ends connected to the frame, a lever pivoted between its ends to the said frame and extending outward over and parallel with and having its outer end pivoted to the said movable support, a treadle, and connection between the treadle and the inner end of said lever, substantially as described.

14. In an ironing-machine, the combination, with the main frame, of a stationary and movable roller, a support having laterally-extending ears to which the journals of the movable roller are connected, links which extend at right angles to the movable support and roller and which have one end connected to the support and their opposite ends connected to the frame, a lever for operating the support, an operating-treadle, and a connection between the treadle and the lever, substantially as set forth.

LEWIS H. WATSON.

Witnesses:
W. R. OMOHUNDRO,
A. M. BENNETT.